United States Patent [19]

Goto

[11] Patent Number: 4,832,169

[45] Date of Patent: May 23, 1989

[54] FRAMEWORK STRUCTURE FOR AN INCLINED PASSENGER CONVEYOR SUCH AS AN ESCALATOR

[75] Inventor: Shigeru Goto, Ichinomiya, Japan

[73] Assignee: Mitsubishi Denki Kabushiki Kaisha, Tokyo, Japan

[21] Appl. No.: 690,366

[22] Filed: Jan. 9, 1985

Related U.S. Application Data

[62] Division of Ser. No. 448,501, Dec. 9, 1982, abandoned.

[30] Foreign Application Priority Data

Dec. 21, 1981 [JP] Japan .................. 56-190632

[51] Int. Cl.$^4$ .............................. B66B 21/00
[52] U.S. Cl. ...................... 198/326; 53/446; 206/321
[58] Field of Search ............ 198/860, 861, 326, 321, 198/860.2; 53/446; 206/321

[56] References Cited

U.S. PATENT DOCUMENTS

| | | | |
|---|---|---|---|
| 807,564 | 12/1905 | Lorillard | 198/321 |
| 2,670,892 | 3/1954 | Kendrick | 206/321 |
| 3,468,086 | 9/1969 | Warner | 206/321 |
| 3,707,220 | 12/1972 | Boltrek et al. | 198/860 |
| 3,925,959 | 12/1975 | Dykes et al. | 53/446 |
| 4,396,112 | 8/1983 | von Wietersheim | 198/861 |

FOREIGN PATENT DOCUMENTS 51-49114 12/1976 Japan .
48434 11/1981 Japan .
56-48434 11/1981 Japan .

Primary Examiner—Joseph E. Valenza
Assistant Examiner—K. Shane
Attorney, Agent, or Firm—Wenderoth, Lind & Ponack

[57] ABSTRACT

A framework structure for an inclined passenger conveyor has a pair of horizontal framework portions and an inclined framework, each being a truss with a rectangular cross-section, the horizontal framework portions being at opposite ends of the framework structure and at a different height from each other with the inclined framework being connected between them. The horizontal framework portions each having an external shape in the form of a substantially rectangular parallelepiped and have one end surface angled at an angle to the horizontal axis thereof which is part of the angle between the horizontal framework portion and the inclined framework. The inclined framework has an external shape in the form of a substantially rectangular parallelepiped and has both end surfaces angled at an angle to the longitudinal axis thereof at angles which are respectively the remainder of the angles between the inclined framework and the horizontal framework portions, the angled end surfaces of the respective horizontal framework portions and the inclined framework abutting each other, and joint devices connecting the inclined framework and the lower and upper horizontal framework portions into a rigid framework structure.

3 Claims, 3 Drawing Sheets

FRAMEWORK STRUCTURE FOR AN INCLINED PASSENGER CONVEYOR SUCH AS AN ESCALATOR

This application is a division of now abandoned application Ser. No. 448,501, filed Dec. 9, 1982, abandoned.

BACKGROUND OF THE INVENTION

This invention relates to improvements in the structure of a framework for an inclined passenger conveyor, such as an escalator.

Conventional structures of a framework for a passenger conveyor have been disclosed, for example, in Japanese patent publication Nos. 49114/1976 and 48434/1981. One of those conventional structures comprises a lower framework constituted by a truss having a rectangular cross-section and made up of a plurality of steel bars and including a horizontal portion and an inclined portion connected to the horizontal portion by a bent part at a predetermined angle to the horizontal portion, an upper framework similar to the lower framework, and an intermediate or inclined framework constituted by a truss similar to that of each of the lower and upper frameworks and connected between the inclined portions of the lower and upper frameworks by respective angle splice members to form together with the inclined portions of the lower and upper frameworks, a rectilinear inclined portion of the structure.

In such conventional framework structures, each of the lower and upper frameworks has horizontal and inclined portions, which makes it difficult to assemble the respective trusses accurately. Also, it has been necessary for the welding operation to use complicated welding jigs, and it has been necessary to perform the operations at elevated positions, thus causing the manufacturing cost to be rather high. Furthermore the individual lower, upper and intermediate frameworks of such framework structures have generally been individually packed and conveyed to the building sites where they are assembled. It has been necessary to make the packings for the lower and upper frameworks large because of the presence of the inclined portions thereof. This has resulted in the disadvantages that the conveying cost is increased and, during their conveyance to the building sites, the packages for such frameworks require relatively large passageways to accommodate them. In addition, the package for the upper framework requires much labor to handle because a conveying skid must be placed thereunder to prevent the upper framework from being deformed due to its own weight.

Accordingly it is an object of the present invention to provide a new and improved framework structure for a passenger conveyor, which framework can be easily manufactured and readily conveyed to the desired building site.

SUMMARY OF THE INVENTION

These objects are achieved according to the invention by the provision of a framework structure for an inclined passenger conveyor, comprising: a pair of horizontal framework portions and an inclined framework, each being a truss with a rectangular cross-section, said horizontal framework portions being at opposite ends of said framework structure and at a different height from each other, said inclined framework being connected between said pair of horizontal framework portions, one of said horizontal framework portions being a lower horizontal framework portion having an external shape in the form of a substantially rectangular parallelepiped and having one end surface angled at an angle to the horizontal axis thereof which is part of the angle between said lower horizontal framework portion and said inclined framework, the other of said framework portions being an upper horizontal framework portion having an external shape in the form of a substantially rectangular parallelepiped and having one end surface angled at an angle to the horizontal axis thereof which is part of the angle between said upper horizontal framework portion and said inclined framework, said inclined framework having an external shape in the form of a substantially rectangular parallelepiped and having both end surfaces angled at an angle to the longitudinal axis thereof at angles which are respectively the remainder of the angles between said inclined framework and said horizontal framework portions, the angled end surfaces of the respective horizontal framework portions and said inclined framework abutting each other, and joint devices connecting said inclined framework and said lower and upper horizontal framework portions into a rigid framework structure.

Preferably the joint devices each comprise a joint plate disposed on one of the angled end surfaces of the inclined framework and another joint plate in opposed relationship on the angled end surface of the abutting horizontal framework portion, and fastening means for connecting the opposed joint plates to each other.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
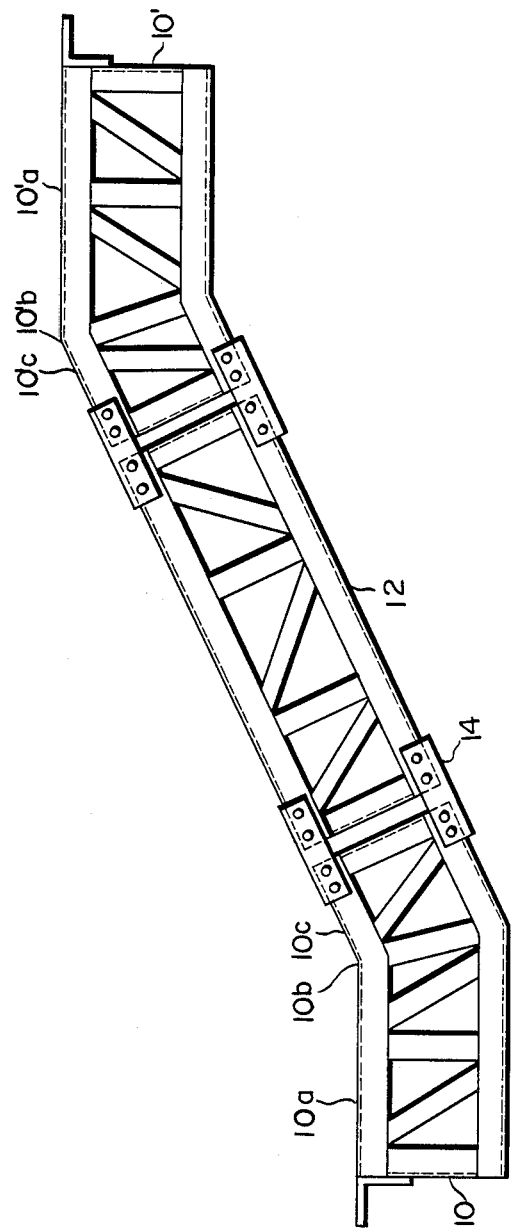
FIG. 1 is a side elevational view of a conventional framework structure for an inclined passenger conveyor.

Referring now to FIG. 1 of the drawings, there is illustrated a conventional framework structure for an inclined passenger conveyor. The arrangement illustrated comprises a lower framework 10 constituted by a truss having a rectangular cross-section and made up of a plurality of steel bars and a horizontal portion 10a connected by a bent part 10b to an inclined portion 10c which is at a predetermined angle to the horizontal portion 10a. The arrangement further comprises an upper framework 10' similar in construction to the lower frameowrk 10 and including a horizontal portion 10'a connected by a bent part 10'b to an inclined portion 10'c. An intermediate framework 12 is provided which is a truss similar to that of each of the lower and upper frameworks 10 and 10' respectively and connected at both ends to the inclined portions 10a and 10'a of the lower and upper frameworks 10 and 10' by angle splice members 14 to form with the tilted portions 10a and 10'a an inclined part of the framework structure.

The lower, upper and intermediate frameworks 10, 10' and 12 are connected together into a unitary structure by the angle splice members 14, thus forming a framework structure for an inclined passenger conveyor.

In such conventional framework structures for a passenger conveyor as described above, each of the lower and upper frameworks 10 and 10' has the respective horizontal portions 10a or 10'a and the inclined portions 10c or 10'c. Because of this structure, it has been difficult to assemble the respective trusses accurately into the framework structure. Also, in performing the welding operations, it has been necessary to use complicated jigs, and it has been necessary to perform the operations at elevated positions, resulting in rather high manufacturing costs.

Figure 2:
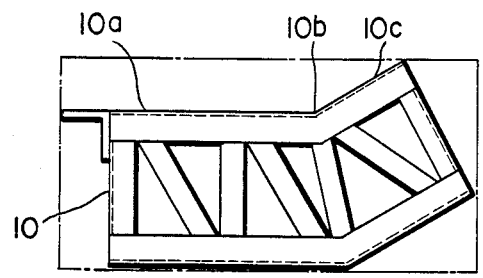
FIG. 2 is a side elevational view of the lower framework shown in FIG. 1 and showing schematically how the lower framework is packed for being conveyed to a building site.
Figure 3:
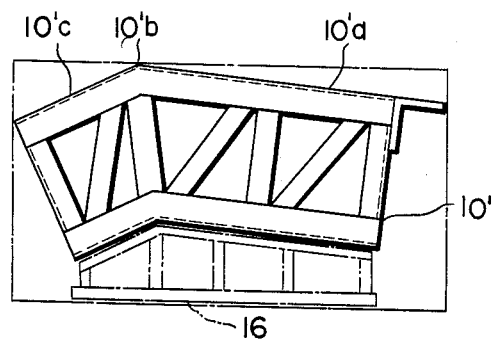
FIG. 3 is a view similar to FIG. 2 but illustrating the upper framework shown in FIG. 1.
Figure 6:
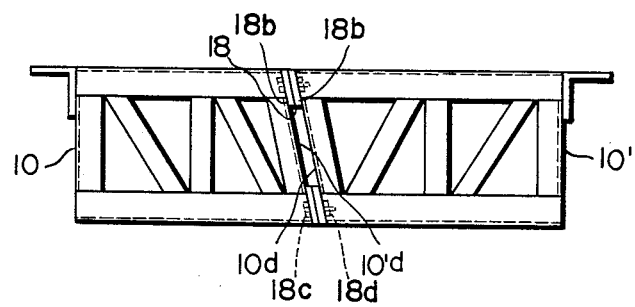
FIG. 6 is a side elevational view of the lower and upper horizontal frameworks shown in FIG. 4 and connected to each other for being conveyed to a building site.

Furthermore such conventional frameworks have generally been separately conveyed to the places where they are assembled, and to do this the lower, upper and intermediate frameworks 10, 10' and 12 have been separately packed. The packings for the lower and upper frameworks 10 and 10' have been required to be quite large, as shown by the broken line rectangles in FIGS. 2 and 3. This has resulted in the disadvantages of rather high conveying costs and limitations on the routes of conveyance to the desired sites because of the limitations on the size of the passageways which will accomodate the packings. In addition, the packing for the upper framework 10' has required much labor because, in order to prevent the upper framework 10' from being deformed due to its own weight, a conveying skid must be put thereunder, as shown by the broken line 16 in FIG. 3.

The present invention seeks to eliminate the disadvantages of the prior art structure as described above.

Figure 4:
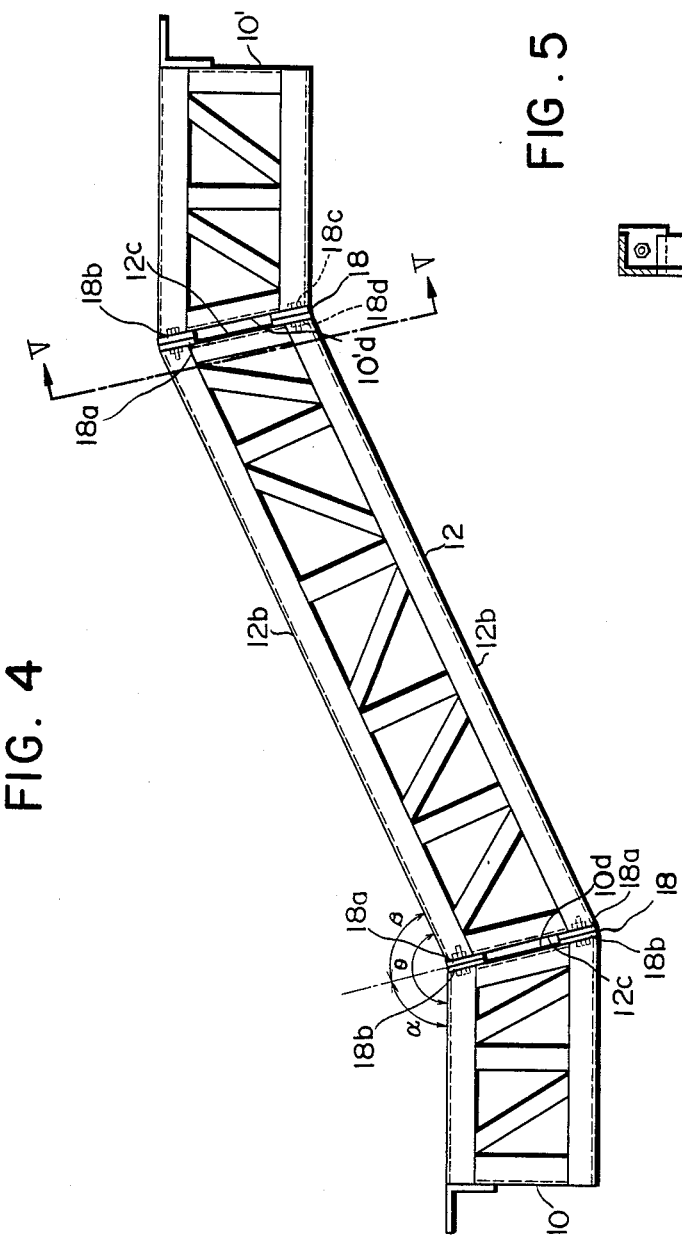
FIG. 4 is a side elevational view of an embodiment of the framework structure of the present invention.

Referring now to FIG. 4 wherein like reference numerals designate components identical to or corresponding to those shown in FIG. 1, there is illustrated one embodiment according to the invention of a framework structure for an inclined passenger conveyor, such as an escalator. As in the arrangement of FIG. 1, the framework structure illustrated is a truss with a rectangular cross-section and comprises a pair of horizontal framework portions disposed at both ends thereof and at different heights from each other, and an inclined framework connected between the pair of horizontal portions at a predetermined angle to the horizontal. Preferably the cross-sectional profiles are identical to each other in shape and size. However the bend between the inclined portion and the respective lower and upper horizontal portions is at the joint between the inclined framework and the horizontal portions.

More specifically, the framework structure comprises a lower horizontal framework portion 10 disposed at the lower end thereof, an upper horizontal framework portion 10' disposed at the upper end thereof, and an inclined framework 12 connected between the lower and upper horizontal framework portions 10 and 10' respectively. Each of the lower and upper horizontal framework portions 10 and 10' and the inclined framework 12 is a truss having an external shape in the form of a substantially rectangular parallelepiped.

The lower horizontal framework portion 10 consists of the rectangular parallelepiped truss, and has no inclined portion 10c such as the corresponding prior art lower framework as shown in FIG. 1, but instead has an angled end surface 10d which lies on a plane corresponding to a section through the bent part 10b of the prior art horizontal framework. The end surface 10d is at an angle $\alpha$ to the longitudinal axis of the framework portion 10 equal to the angle of said section to said longitudinal axis. The angle is preferably about half the obtuse angle $\theta$ between the horizontal framework portion 10 and the inclined framework 12. The upper horizontal framework portion 10' is identical in cross-sectional profile and size to the lower horizontal framework portion 10 and has an angled end surface 10'd. The angled end surface 10'd is also located on a plane corresponding to a section through the bent part 10'b and is at an angle to the longitudinal axis thereof which is supplemental to the angle of the angled end surface 10d of the lower horizontal framework portion 10 to the longitudinal axis thereof.

The inclined framework 12 connected between the lower and upper horizontal frameworks 10 and 10' has both end surfaces angled at respective angles $\beta$ which is equal to the angle $(\theta - \alpha)$, i.e. the balance of the obtuse angle $\theta$ between the horizontal framework portions 10a and 10'a and the inclined framework 12.

Figure 5:
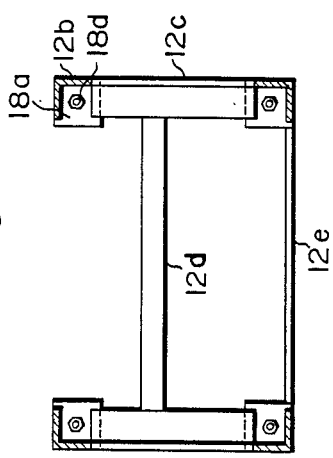
FIG. 5 is a cross sectional view of the inclined framework shown in FIG. 4 as viewed on the line V—V of FIG. 4.

In FIG. 5, wherein there is illustrated a sectional view of the inclined framework 12 as viewed on the line V—V of FIG. 4 parallel to the end surface 10'd thereof, the inclined framework 12 is shown as including four longitudinal frame members 12b of angle steel forming the corners of the truss and a pair of lateral frame members 12c of similar angle steel disposed at each end of the framework 12 and connected to the ends of the mating longitudinal frame members 12b. Each of the lateral frame members 12c has one leg welded at opposite ends to vertical legs of the upper and lower longitudinal frame members 12b so as to be substantially flush therewith, and the other leg connected to the other lateral frame member 12c by an intermediate steel strip 12d and substantially flush with the adjacent ends of the mated upper and lower frame members 12b. In addition the lower longitudinal frame members 12b are connected to each other by a bottom steel strip 12e. The inclined framework 12 has the remaining lateral frame members in the form of steel strips welded to the vertical legs of the longitudinal frame members 12b so as to be substantially flush therewith.

The lower and upper horizontal framework portions 10 and 10' have a similar structure.

Then the inclined framework 12 is connected to the angled end surfaces 12a of the horizontal framework portions 10 and 10' by joint devices generally designated by the reference numerals 18, one at each corner of the cross-section of the framework structure.

Each joint device 18 comprises a square joint plate 18a fixed to the angled end surface 12a of the inclined framework 12, there being one at each of the four corners of the cross-section thereof in this case, on the ends of the longitudinal frame members 12b and the adjacent ends of the mating lateral frame members 12c, for example by welding as shown in FIG. 5. The joint device 18 includes further includes a second joint plate 18b (see FIG. 4) fixed to the angled end surface 10d or 10'd of the horizontal framework portion 10 or 10' in the same manner as the first joint plate 18a is fixed to the inclined framework. Finally, the joint device has a bolt 18c and nut 18d for holding the joint plates 18a and 18b together.

From the foregoing it will be seen that when the angled end surface 12a of the inclined framework 12 is butted against a corresponding angled end surface 10d or 10'd of the upper or lower horizontal framework portions 10' of 10, the joint plates 18a are directly opposed to the joint plates 18b respectively because the plates 18a are located at positions on the inclined end surface 12a opposed to the plates 18b on the angled end surfaces 10d and 10'd. Then a bolt 18c is threaded through each pair of abutting first and second joint plates 18a and 18b respectively and a nut 18d is threaded onto each of the bolts 18c to fasten the inclined framework 12 to the upper and lower horizontal framework portions 10 and 10'. Each set of a bolt and nut form fastening means forming one part of the joint device 18.

From the foregoing it will be seen that the respective horizontal and inclined framework portions 10, 10' and 12 are connected together into a unitary structure by the joint devices 18 to provide a framework structure for an inclined passenger conveyor. As described above, each of the lower and upper framework portions 10 and 10' includes the angled end surface 10d and 10'd lying on a plane corresponding to a section through the angle between the horizontal framework portions and the inclined framework. Thus each of the horizontal framework portions 10 and 10' is a rectilinear parallelepiped, i.e. it has no portion extending away from it at an angle. Further, the angle of the end surface 10d to the longitudinal axis thereof is supplemental to the angle of the end surface of the upper framework 10' to the longitudinal axis thereof. In the preferred embodiment these angles are equal, so that the angled end surface of the lower horizontal framework 10 is at an angle to the longitudinal axis thereof which is equal to the angle of the angled end of the upper horizontal framework 10' to the longitudinal axis thereof.

In addition, the inclined framework 12 has the opposite end surfaces 12a at angles to the longitudinal axis thereof equal to each other and, as shown in FIG. 4, equal to the angle of the respective adjacent angled end surfaces 10d or 10'd of the lower and upper framework portions 10 and 10'.

Thus the horizontal framework portions 10 and 10' can be easily manufactured using only a single set of manufacturing jigs and simplified welding jigs. Accordingly, the horizontal framework portions 10 and 10' can be assembled with the inclined framework with high accuracy and by carrying out only simple operations, because the operators are required to assemble only framework portions having end surfaces inclined at equal angles to each other. Also, when inclined framework 12 having different angles of inclination and are to be used, associated horizontal framework portions can be simply manufactured by merely changing the manufacturing jigs so that the ends are at angles half such different angles of inclination.

Similarly, the inclined framework can be manufactured in a simple manner.

Further, when the framework structure of the present invention is to be conveyed to the desired building site, the lower and upper horizontal framework portions 10 and 10' can be interconnected by temporarily connecting the first joint plates 18a disposed on the angled end surfaces 10d and 10'd thereof with the framework portions 10 and 10' aligned with each other, as shown in FIG. 5. This is because the angled end surfaces 10d and 10'd of the lower and upper horizontal framework portions 10 and 10' are at respective angles to the longitudinal axes thereof supplemental to each other and because the first joint plates 18a on inclined framework 12 are disposed at the same positions on the inclined end surface as the second joint plates 18b on each of the lower and upper horizontal framework portions 10 or 10'. Accordingly the thus interconnected lower and upper horizontal framework portions 10 and 10' can be conveyed to the desired site after placing them in a single small-sized package. This brings about a reduction in packaging and conveying costs and also removes some of the limitations on the conveying path.

From the foregoing it is seen that the present invention provides a framework structure for an inclined passenger conveyor which makes possible both a simplified manufacture and easier conveyance, resulting in reduced costs of manufacture and conveyance.

While the present invention has been illustrated and described in conjunction with a single preferred embodiment thereof, it is to be understood that numerous changes and modifications may be resorted to without departing from the spirit and scope of the present invention. For example, each of the end surfaces of the inclined framework 12 has been shown in FIG. 4 as being at an angle to the longitudinal axis thereof equal to that of the mating end surface on the lower or upper horizontal framework portion 10 or 10'. However, it is to be understood that the present invention is not restricted thereby or thereto and that the former angle may be different from the latter angle. Also there can be provided first and second sets of joint devices each including a plurality of joint plates disposed on a different inclined end surfaces of the inclined framework and the lower and upper horizontal framework portions and located at opposed positions other than the corner positions on the inclined end surfaces.

What is claimed is:

1. A package of parts of an inclined passenger conveyor for transport from a manufacturing site to an installation site, comprising:

a pair of horizontal framework portions, each being a truss with a rectangular cross-section, said horizontal framework portions being for attachment to the opposite ends of an inclined framework for assembly into an inclined passenger conveyor, one of said horizontal framework portions being a lower horizontal framework portion having an external shape in the form of a substantially rectangular parallelepiped and having one end angled at an angle to the horizontal axis thereof which is part of the angle in the assembled inclined passenger conveyor between said lower horizontal framework and the inclined framework, the other of said horizontal framework portions being an upper horizontal framework portion having an external shape in the form of a substantially rectangular parallelepiped and having one end angled at angle to the horizontal axis thereof Which is part of the angle in the assembled inclined passenger conveyor between said upper horizontal framework portion and the inclined framework, the angles of the one ends of the respective horizontal framework portions relative to the horizontal being supplemental angles, the angled ends abutting each other and the horizontal framework portions extending horizontally; and joint devices temporarily connecting said angled ends to each other.

2. A package as claimed in claim 1 wherein each said joint device comprises a pair of opposed joint plates, one of said joint plates being on said angled end of each of the abutting horizontal framework portions and fastening means for connecting said opposed joint plates to each other.

3. A package as claimed in claim 1 where said lower and upper horizontal framework portions have cross-sectional profiles identical to one another in shape and size.

* * * * *